United States Patent [19]

Beshouri

[11] Patent Number: 5,200,433
[45] Date of Patent: Apr. 6, 1993

[54] PROCESS FOR PREPARING LOW DENSITY POROUS CROSSLINKED POLYMERIC MATERIALS

[75] Inventor: Sharon M. Beshouri, Houston, Tex.

[73] Assignee: Shell Oil Company, Houston, Tex.

[21] Appl. No.: 870,858

[22] Filed: Apr. 20, 1992

[51] Int. Cl.$^5$ ............................................. C08J 9/28
[52] U.S. Cl. ........................................ 521/64; 521/62; 521/63; 521/146; 521/149
[58] Field of Search ............... 521/62, 63, 64, 146, 521/149

[56] References Cited

U.S. PATENT DOCUMENTS

| | | | |
|---|---|---|---|
| 3,912,666 | 10/1975 | Spitzer et al. | 521/72 |
| 3,915,726 | 10/1975 | Hansen et al. | 521/64 |
| 3,992,333 | 11/1976 | Emmons et al. | 521/65 |
| 4,432,920 | 2/1984 | Ishikawa et al. | 521/61 |
| 4,522,953 | 6/1985 | Barby et al. | 521/64 |
| 4,788,225 | 11/1988 | Edwards et al. | 521/62 |
| 5,149,720 | 9/1992 | DesMarais et al. | 521/63 |

Primary Examiner—Morton Foelak

[57] ABSTRACT

The present disclosure is directed to using a blend of sorbitan esters as a surfactant to produce a stable water-in-oil high internal phase emulsion in the preparation of a low density porous crosslinked polymeric material. This process produces low density, high capacity, porous, crosslinked, polymeric materials with improved absorption capacity and foam properties.

23 Claims, No Drawings

PROCESS FOR PREPARING LOW DENSITY POROUS CROSSLINKED POLYMERIC MATERIALS

FIELD OF INVENTION

This invention relates to the preparation of low density, porous, crosslinked, polymeric materials. In one aspect, the invention relates to a process to manufacture low density porous crosslinked polymeric materials having improved physical properties by a high internal phase water-in-oil emulsion polymerization process.

BACKGROUND OF THE INVENTION

Polymeric foams can be generally classified as either closed-cell foams or as open-cell foams. Open-cell foams can be used as a matrix to contain various liquids and gases. They are capable of various industrial applications such as, for example, use as wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion (HIPE) having relatively small amounts of a continuous oil phase and relatively greater amounts of an internal water phase. Further, other properties such as thin dry thickness (i.e., thickness of the polymer product after removal of water) and low compressive strain (i.e., resistance to compression deflection) are also desirable for use as an absorbent.

Typically, these high absorption capacity, low density foams are prepared by forming a high internal phase water-in-oil emulsion (typical water to oil ratio of above 9:1) in the presence of a surfactant and polymerizing the monomers in the oil phase of the emulsion with a polymerization initiator at a temperature of around 60° C. for about 8 hours. However, it has been found that at a higher water to oil ratio of above 30:1, the stability of the emulsion is poor, sometimes causing the emulsion to break.

It is therefore an object of the present invention to provide a water-in-oil high internal phase emulsion with improved stability at higher water to oil ratios. It is another object of the present invention to provide a process to prepare low density, porous, crosslinked, polymeric foams with improved absorption capacities and foam properties.

SUMMARY OF THE INVENTION

According to the invention, a process for the production of a porous crosslinked polymeric material is provided, comprising the steps of:

(a) providing a water-in-oil high internal phase emulsion comprising (i) a mixture of polymerizable monomers comprising at least one vinyl monomer and from about 2 to about 50 weight percent, based on the mixture, of a difunctional unsaturated crosslinking monomer, (ii) at least 90 weight percent, based on the emulsion, of water as the internal phase (iii) from about 2 to about 40 weight percent, based on the polymerizable monomers, of a surfactant comprising as component (A) a sorbitan monoester having a fatty acid moiety of at least 6 carbon atoms and as component (B) at least one other sorbitan ester having at least one fatty acid moiety different than the fatty acid moiety of component (A), and (iv) an effective amount of a polymerization catalyst to cure the polymerizable monomers; and (b) heating the water-in-oil high internal phase emulsion under conditions effective to cure the polymerizable monomers. The process provides low density, open-cell foams having high adsorption capacity and good foam properties.

DETAILED DESCRIPTION OF THE INVENTION

According to the invention, a low density porous crosslinked polymeric material (hereinafter "foam") having high absorption capacity and good resistance to compression deflection can be prepared by polymerizing monomers in a water-in-oil high internal phase emulsion by using a certain blend of sorbitan ester surfactants. These foams generally have a dry density of less than about 0.1 g/cc.

Various monomers may be used in the preparation of the porous polymeric material, provided the monomers can be dispersed in or form an oil phase of a water-in-oil high internal phase emulsion and have a polymerizable vinyl group. Suitable vinyl monomers include, for example, monoalkenyl arene monomers such as styrene, o-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; and mixtures thereof.

Suitable crosslinking agents can be any difunctional unsaturated monomers capable of reacting with the vinyl monomers. Difunctional unsaturated crosslinking monomers include, for example, divinyl benzene, diethylene glycol dimethacrylate, 3-butylene dimethacrylate, and allyl methacrylate. Crosslinking monomers are typically present in an amount of from about 2 weight percent to about 50 weight percent, preferably from about 5 weight percent to about 40 weight percent based on the total monomer mixture.

Suitable polymerization catalysts can be water-soluble or oil-soluble. Water-soluble catalysts include, for example, potassium or sodium persulfate and various redox systems such as ammonium persulfate together with sodium metabisulfite. Oil soluble (monomer soluble) catalysts include, for example, azodibisisobutyronitrile (AIBN), benzoyl peroxide and di-2-ethyl-hexyl-peroxydicarbonate. Typically, the catalyst can be present from about 0.005 to about 15 weight percent based on the monomers. The polymerization catalyst can be in the water phase and polymerization occurring after transfer of the catalyst into the oil phase or an activated monomer/catalyst reaction product can be added to the oil phase. Alternatively, the polymerization catalyst may be introduced directly into the oil phase. Preferably, the polymerization catalyst is added in the water phase and polymerized after transfer of the catalyst into the oil phase for ease of handling.

The relative amounts of the water and oil phases used to form the high internal phase emulsion are a factor in determining the structural, mechanical and performance properties of the resulting polymeric foams. The ratio of water and oil in the emulsion can influence the density, cell size, and specific surface area of the foam products. To form a polymeric foam product with suitable density and high absorption capacity, the water-in-oil high internal phase emulsion typically contains as the internal phase, at least about 90 weight percent, based on the emulsion, of water, corresponding to a water to oil weight ratio of at least about 9:1, more preferably at least about 95 weight percent of water.

The internal water phase can preferably contain a water-soluble electrolyte to stabilize the HIPE and to make the foam more water wettable. Suitable electrolyte includes inorganic salts (monovalent, divalent, trivalent or mixtures thereof), for example, alkali metal salts, alkaline metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or di-valent salts with monovalent anions such as halides are preferred.

The formation of the water-in-oil high internal phase emulsion is dependent on a number of factors such as the monomers used, water to oil ratio, mixing conditions, type and amount of surfactant used, presence and the amount of water-soluble electrolyte. Unless all of these factors are such that a water-in-oil emulsion is favored, the emulsion will form a oil-in-water emulsion rather than water-in-oil high internal phase emulsion. The formation of a water-in-oil emulsion is described in U.S. Pat. No. 4,522,953, the disclosure of which is herein incorporated by reference.

In general, to form the water-in-oil emulsion, the water can be mixed in any way up to a water to oil ratio of about 13:1, preferably up to about 10:1. An oil-in-water emulsion becomes preferred if the water was added all at once beyond a water to oil ratio of about 13:1. Typically, the water must be added gradually with a moderate rate of shear. A small capacity mixer such as a paint mixer with a shear rate of at least about 5 s$^{-1}$, preferably at least about 10 s$^{-1}$ can be used to mix the water-in-oil emulsion. A pin gap mixer with a shear rate of at least about 50 s$^{-1}$, preferably at least about 100 s$^{-1}$ is preferred. If the shear rate is too low, the water-in-oil emulsion will revert to an oil-in-water emulsion. It is desirable to at least have a water to oil ratio of about 9:1, preferably at least about 19:1, more preferably at least about 29:1 for a high absorbency capacity foam.

Stability of the high internal phase emulsion (HIPE) is important so the emulsion will not degrade during the curing process. It has been found that when higher water to oil ratios of above about 30:1 were used, satisfactory HIPEs and/or foams were difficult to form using a single surfactant like sorbitan monolaurate, sorbitan monopalmitate or sorbitan monostearate.

Mixtures of sorbitan esters are used in the preparation of the foams of the invention. Sorbitan is a mixture of anhydrosorbitols, principally 1,4-sorbitan and isosorbide. Sorbitan esters can be prepared commercially by direct esterification of sorbitols with fatty acids at a temperature from about 225° C. to about 250° C. in the presence of an acidic catalyst or basic catalyst.

In order to form a good stable emulsion and satisfactory foams at higher water to oil ratios, a combination of sorbitan ester surfactants should be used. The amount of surfactant used must be such that a water-in-oil high internal phase emulsion will form. Generally, the surfactant can be present from about 2 to about 40% by weight, preferably about 5 to about 25% by weight based on the monomers.

In order to obtain a-good stable emulsion according to the invention, a mixture of sorbitan esters having different fatty acid moieties should be used. Fatty acid moieties being defined as RCOO— where R is hydrocarbon. Preferably, from about 2 to about 40 weight percent, based on the polymerizable monomers, of a surfactant comprising as component (a) at least one sorbitan monoester having a fatty acid moiety of at least 6 carbon atoms, more preferably within the range of about 6 to 30 carbon atoms, and as component (b) at least one other sorbitan ester having at least one different fatty acid moiety (more preferably having a different chain length) than the fatty acid moiety of component (a) should be present. More preferably, as component (a) at least from about 5 weight percent to about 95 weight percent, based on the surfactant, of a sorbitan monoester having a $C_{12}$, $C_{16}$ or $C_{18}$ fatty acid group moiety should be present in combination with as component (b) at least one other sorbitan ester having at least one different fatty acid moiety of at least 6 carbon atoms, more preferably, within the range of about 6 to about 30 carbon atoms. The surfactant can be a mixture of three or more sorbitan esters, that is, component (b) can be two or more esters, as long as at least from about 5 to about 95 weight percent of a sorbitan $C_{12}$, $C_{16}$ or $C_{18}$ fatty acid monoester is present. The sorbitan monoester of component (a) is more preferably present in an amount from about 10 to about 90 weight percent, most preferably from about 25 to about 75 weight percent, based on the surfactant, to obtain good emulsion.

Preferable sorbitan monoesters of component (a) are sorbitan monolaurate, sorbitan monopalmitate, sorbitan monostearate and sorbitan monooleate. Commercially available sorbitan monoesters of component (a) include SPAN ® emulsifying agents 20, 40, 60 and 80, and ALKAMULS ® sorbitan esters SML and SMO among others.

Sorbitan esters of component (b) can be any sorbitan ester as long as at least one fatty acid moiety is different than the fatty acid moiety of component (a). The sorbitan ester of component (b) can be a mono-, di- or tri- sorbitan ester. Preferable sorbitan esters of component (b) include for example, mono- or di- or tri- sorbitan caproate, sorbitan caprulate, sorbitan capriate, sorbitan laurate, sorbitan myristate, sorbitan palmitate, sorbitan stearate, sorbitan oleate, sorbitan linolate, and sorbitan linolenate. Commercially available sorbitan esters of component (b) include SPAN ® emulsifying agents 20, 40, 60, 65, 80, and 85 (from Fluka Chemical Corp.), and ALKAMULS ® sorbitan esters SML, SMO, SMS and STO (from Alkaril Chemicals Ltd.) among others.

The more preferred combination of components (a) and (b) include any mixture of sorbitan esters having different chain length fatty acid moiety disclosed above such as, for example, a mixture of sorbitan monolaurate and sorbitan monopalmitate; sorbitan monolaurate and sorbitan monooleate; sorbitan monolaurate and sorbitan monostearate; sorbitan monolaurate and sorbitan trioleate; sorbitan monopalmitate and sorbitan monooleate; sorbitan monopalmitate and sorbitan monostearate; sorbitan monooleate, sorbitan trioleate and sorbitan monolaurate; and sorbitan monostearate, sorbitan tristearate and sorbitan monopalmitate.

Particularly, a surfactant mixture containing at least two different sorbitan esters selected from sorbitan monolaurate, sorbitan monopalmitate, sorbitan monostearate and sorbitan monooleate is preferred. The combination surfactants will also give a more stable emulsion and better foam properties than a single surfactant even at lower water to oil ratios. A surfactant mixture containing sorbitan monolaurate and sorbitan monopalmitate or a mixture containing sorbitan monolaurate and sorbitan monostearate is most preferred for preparing foams with high absorption capacity and good foam properties such as hi resistance to compression deflection value. It has been that a mixture of sorbitan monolaurate and sorbitan monopalmitate produces foams with the highest absorption capacity.

A good high internal phase water-in-oil emulsion is one where a desired high water to oil ratio is achievable without substantial degradation of the emulsion. Degradation or deterioration of the foam can be seen by free, unabsorbed water standing on the emulsion surface (or forming a pool of water) after the emulsion is made. Thus, when a good emulsion is cured, generally there is no or little free unabsorbed water visible after curing. The emulsion is substantially degraded when the emulsion generally degrades more than 5 weight percent measured by the amount of free unabsorbed water, based on the total water used to prepare the emulsion. Preferably, the emulsion should deteriorate less than about 10 weight percent, preferably less than about 5 weight percent of water, based on total water used to prepare the emulsion, during curing.

A good emulsion is also one which does not produce a foam with large visible holes or defects that will give the resultant foam an appearance similar to Swiss cheese. The presence of such defects could indicate an unstable emulsion in which the surfactants allowed coalescence of water droplets in the emulsion. Emulsion stability can also be seen by uniform hole sizes in the cured foams resulting from water droplets uniformly dispersed in the emulsion. A good emulsion generally has a creamy, opalescent appearance, with the consistency of stirred yogurt: A poor emulsion is thin, like water, and similar in appearance to a broth.

Generally, the monomers in the HIPE can be cured at above room temperature (above about 25° C.) up to about 90° C.. Preferably, the monomers in the HIPE are cured by heating at a temperature within the range of about 30° C. to about 70° C. for a time effective to cure the monomers to obtain good properties without substantial deterioration of the emulsion. Generally, the extent of reaction after curing is at least about 85% of the monomers, preferably at least about 90%, most preferably at least about 95% in order to obtain good properties. Generally, to obtain the desired extent of reaction, the monomers should be cured for at least one hour at 60° C.

These foams prepared by the invention process may be washed and dried to yield an absorbent block which is especially useful for the absorption of liquids. Typically, these foams are washed with a solvent to reduce the electrolyte content of the foam. Suitable solvents include, for example, alcohols, low concentration electrolyte solutions (lower concentration than the water phase) such as 1% calcium chloride solution or deionized water. The washed foams can generally be dried by squeezing the water and/or solvent out of the foams and/or by using air, heat or vacuum drying. The foams produced by the invention process possess small dry thickness value and a high absorption capacity, especially suitable for use in liquid absorbent articles such as wipes, diapers and catamenial products for example.

ILLUSTRATIVE EMBODIMENT

The following illustrative embodiments describe the process of the invention and are provided for illustrative purposes and are not meant as limiting the invention.

WASHING AND DRYING METHOD

All of the foams prepared below were washed and dried as follows: After the foam blocks were cured, the blocks were sliced to 0.35 inches (0.89 cm) thickness. Then, each individual slice was placed on a 0.04 inch (0.1 cm) mesh screen between a 9"×6.75" (22.9 cm×17.1 cm) stainless steel plate that allowed the slice to be squeezed to a 0.45 inch (1.14 cm) thickness. The squeezed slices were placed in an ANVIL-press made by ARBOR and the calcium chloride solution was squeezed out. The slices were then washed and squeezed twice by soaking the slices in a 2 gallon 1% calcium chloride solution and placing in the ANVIL-press. Then, after the slices have been squeezed, a paper towel was placed on both sides of the washed slices and squeezed again to remove excess water from the slice. The slices were then placed in an oven at a temperature of 60° C. for 4 hours to dry. The washed and dried foam slices were analyzed for physical properties as discussed below.

TESTING METHODS

Free Swell/Dry Thickness/Swollen Thickness/Foam Density/Percent Strain/Resistance to Compression Deflection/Swell Ratio A 2"×2" (5.08×5.08 cm) square is cut from a foam slice. The thickness of the foam sample is measured while it is dry ("dry thickness") using a dead weight thickness gage (a digital linear gage model EG-225 made by Ono Sokki) exerting less than 50 grams force by a 1.60" diameter disk weighing 100 g. This thickness is called the "caliper." The foam square is soaked in warm 88° F. (31° C.) Syn-Urine from Jayco for 17 minutes. From the 2"×2"(5.08×5.08 cm) square, a circle of 1.129" (2.868 cm) diameter is cut. This disk is re-equilibrated in the Syn-Urine for 5 minutes. The wet disk is then weighed ("initial wet weight").

The thickness of the wet sample is measured using the same load gage ("initial wet caliper"). The disk is then placed under a 0.74 psi stress where stress is the total dead weight applied to the gage divided by the cross-sectional area. The caliper of the disk is measured under this stress after 15 minutes ("wet caliper"). After 15 minutes, the specimen disk is weighed to measure the retained fluid.

The excess urine is squeezed from the disk and the remainder of the square from which it was cut. The foam is placed in boiling water for 15 minutes. The foam is then removed, blotted dry, then placed in a vacuum oven at 60°-70° C. and dried until the foam has fully expanded. The weight of the dry sample is then determined ("final dry weight").

The following values were calculated from the above measurements.

Free swell=initial wet weight/final dry weight
Resistance to Compression Deflection (RTCD)=wet weight after load at 15 minutes/final dry weight
Swell Ratio=RTCD/Free swell×100

$$\% \text{ Strain} = \frac{\text{initial wet caliper} - \text{wet caliper})}{\text{initial wet caliper}} \times 100$$

Foam Volume = (diameter/2)$^2$ × 3.142 × initial wet caliper volume is based on a 1.129" circle cut calculation in cm Foam Density (mg/cm$^3$) = final dry weight × 1000/volume

Vertical Wicking Rate

From a foam slice, cut at 0.36 inches (0.91 cm) thickness, a 1 to 2 cm wide strip is cut, of greater than 5 cm in length. The strip of foam is clamped or taped to a metal ruler, with the bottom of the foam strip flush with the 0 mark on the ruler. The ruler and foam are placed in a container of approximately 100 ml Syn-Urine from Jayco, in an incubator at 99° F. (37° C.) so the bottom of the strip (0 mark) is barely touching the surface of the Syn-Urine (less than 1mm). The Syn-Urine is dyed with food coloring to more easily monitor its absorption and rise in the foam. A stop watch is used to measure the time required for the liquid level to reach 5 cm vertical height in the foam sample.

EXAMPLE 1

This example demonstrates preparation of a low density crosslinked polymeric material according to the invention. Table 1 below describes the surfactant used in the process.

Standard Water Phase (1000 ml)

100 g calcium chloride
1.5 g potassium persulfate
deionized water to make 1000 ml solution

Standard Oil Phase (10 ml)

2 ml styrene
2 ml divinyl benzene
6 ml 2-ethylhexylacrylate
1.2 ml of total surfactant(s) as listed in Table 1

Preparation of Phases

Water phase was prepared by mixing the water phase reagents in a 1000 ml Erlenmeyer flask with a magnetic stir bar, and the resultant mixture was stirred until the salt was dissolved. The water phase was poured into a polyethylene bottle and kept at 62° C. Oil phase was prepared by adding the styrene, divinyl benzene and acrylate to a polyethylene cup, then adding the surfactant(s) listed in Table 1 (sorbitan monolaurate, sorbitan monopalmitate, sorbitan monostearate, sorbitan tristearate, sorbitan monooleate and sorbitan trioleate as SPAN ® emulsifying agents 20, 40, 60, 65, 80 and 85, respectively, from Fluka Chemical Corp.). The oil mixture was warmed approximately 5 minutes at 62° C. to dissolve the surfactant(s) in the monomers.

Emulsion

Oil phase prepared as described above was added to a polyethylene mixing container equipped with a 250 ml addition funnel and a teflon coated paint stirrer (model 06200 PM-70 made by SHUR-LINE ® Inc.). 100 ml of warmed water phase was added to the addition funnel. The paint stirrer was positioned so that the teflon coated impeller rested at the bottom of the container, then 10 ml of the water phase in the funnel was added to the oil phase and stirred by an air-driven stir motor turned on to 200 RPM to form an emulsion. The remaining 90 ml of water phase was added at approximately 2 drops/sec. while stirring the emulsion, then a second 100 ml of water phase was added to the stirring emulsion in a steady stream though the addition funnel. A final 100 ml of water phase was then added to the emulsion while stirring through the addition funnel rapidly. When the addition of the water phase (total of 300 ml) was complete, the cup was removed from the stirrer. The resultant emulsion had the consistency of a yogurt, usually white with a somewhat translucent appearance. The emulsion was poured into a polyethylene tub of approximately 500 ml volume and a lid was placed on top of the tub. The monomers in the emulsion were cured at 60°-62° C. for 18 hours.

Properties of these polymeric products are shown in Table 1 below.

COMPARATIVE EXAMPLE A

In this example, HIPEs were prepared in a similar manner to Example 1 except a single surfactant was used as listed in Table 1. Properties of the polymeric products are shown in Table 1 below.

COMPARATIVE EXAMPLE B

In this example, a mixture of sorbitan esters with the same fatty acid moiety chain were used as the surfactant and prepared in a similar manner to Example 1. Properties of the polymeric products are shown in Table 1 below.

TABLE 1

| # | Surfactant(s) | Ratio | % Strain | RTCD (g/g) | Free Swell (g/g) | Foam Density (mg/cm$^3$) | Dry Thickness (in) | Swollen Thickness (in) | Swell Ratio | Vertical Wicking Rate (s) |
|---|---|---|---|---|---|---|---|---|---|---|
| 1 | L + P | 2:1 | 33.8 | 22.2 | 28.8 | 35.0 | .107 | .400 | 77.0 | >600 |
| 2 | L + S | 2:1 | 33.1 | 23.1 | 26.5 | 36.7 | .103 | .414 | 87.2 | 465 |
| 3 | L + tS | 2:1 | 29.5 | 20.4 | 26.0 | 39.4 | .145 | .420 | 78.3 | 427 |
| 4 | L + O | 2:1 | 59.5 | 15.3 | 30.1 | 32.3 | .148 | .600 | 50.9 | 213 |
| 5 | L + tO | 1:2 | 30.6 | 18.0 | 27.3 | 31.6 | .364 | .369 | 66.1 | 45 |
| 6 | L + O + tO | 1:1:1 | 18.4 | 19.1 | 22.0 | 41.3 | .190 | .385 | 86.7 | 104 |
| 7 | L + S + tS | 4:1:1 | 40.5 | 19.8 | 28.34 | 33.5 | .145 | .485 | 70.1 | 420 |
| 8 | L + P + tO | 2:1:1 | 64.6 | 11.8 | 28.7 | 33.2 | .182 | .551 | 41.0 | 385 |
| 9 | L + P + O | 1:1:1 | 29.5 | 13.0 | 19.2 | 34.0 | .490 | .366 | 67.5 | >600 |
| 10 | L + P + O | 2:1:1 | 68.5 | 13.9 | 29.5 | 35.2 | .119 | .381 | 47.0 | 360 |
| 11 | L + P + tS | 2:1:1 | 38.1 | 16.2 | 24.5 | 31.0 | .315 | .312 | 65.9 | >600 |
| 12 | L + P + S | 2:1:1 | 50.1 | 22.3 | 31.0 | 29.2 | .263 | .343 | 72.0 | 461 |
| 13 | P + tO | 1:1 | 56.0 | 16.4 | 32.8 | 28.3 | .342 | .350 | 50.1 | >600 |
| 14 | P + O | 1:2 | 62.7 | 13.9 | 36.2 | 27.6 | .374 | .373 | 38.5 | >600 |
| A1 | L | | 49.1 | 16.9 | 28.4 | 36.0 | .136 | .344 | 59.7 | 87 |
|   |   |   | 38.9 | 15.6 | 23.7 | 34.9 | .382 | .393 | 65.7 | 324 |
| A2 | P | | 37.1 | 18.7 | 22.1 | 29.6 | .432 | .391 | 84.6 | >600 (NaCl) |

TABLE 1-continued

| # | Surfactant(s) | Ratio | % Strain | RTCD (g/g) | Free Swell (g/g) | Foam Density (mg/cm³) | Dry Thickness (in) | Swollen Thickness (in) | Swell Ratio | Vertical Wicking Rate (s) |
|---|---|---|---|---|---|---|---|---|---|---|
| B | O + tO* | 3:1 | 70.0 | 24.3 | 36.0 | 26.7 | .041 | .257 | 67.5 | 336 |

*total surfactant concentration of 20% was used.
L = sorbitan monolaurate
P = sorbitan monopalmitate
S = sorbitan monostearate
O = sorbitan monooleate
tS = sorbitan tristearate
tO = sorbitan trioleate As can been seen from Table 1, foam property can be modified advantageously depending on the surfactants used. For example, a stiffer foam with improved dry thickness value (thin), RTCD value and swell ratio can be obtained by using a mixture of s sorbitan monolaurate and sorbitan monopalmitate as the surfactant compared with sorbitan monolaurate or sorbitan monopalmitate alone as the surfactant.

EXAMPLE 2

This series of experiments demonstrate the improved o stability of the emulsion prepared by the inventive process by maximizing the water to oil ratio of the high internal phase emulsions.

The emulsions were prepared in a similar manner to Example 1 using 10 ml of monomers and 12% by weight of total surfactants (sorbitan monolaurate, sorbitan monopalmitate, sorbitan monostearate, sorbitan tristearate, sorbitan monooleate and sorbitan trioleate as SPAN ® emulsifying agents 20, 40, 60, 65, 80 and 85, respectively, from Fluka Chemical Corp.) in ratios as shown below in brackets, based on the monomers, except o water phase was added until the emulsion would incorporate no more water. Visually, when the emulsion would hold no more water, the excess water would remain on the surface of the emulsion. Upon pouring the emulsion into the polyethylene tub for curing, this water would stand on the emulsion surface and form pools in the corner of the tub (unabsorbed, free water).

After curing, the excess water (free water) was decanted off of the resultant polymer foam in the tub. This water was measured to determine the amount of free water. The difference between the free water and the maximum total water o used to make the emulsion is the incorporated water (i.e., the water the polymer held).

The water to oil ratio for each of these foams were determined. An example of the improvement seen by the use of the inventive process is noted in series G below. For example, an emulsion made according to the invention with a surfactant mixture of SPAN ® emulsifying agents 20 and 40 in a 2 to 1 ratio had a water to oil ratio of 76:1, resulting in a foam water to oil ratio of 71:1 after subtracting unabsorbed water after curing. By contrast, a 70:1 water to oil emulsion was made using 12% SPAN ® emulsifying agent 20 as the surfactant, resulting in a foam water to oil ratio of 62:1.

SERIES A
SPAN ® 60 + 65[1:1]
total water = 633 ml
free water = 65 ml
incorporated = 568 ml
appearance of the foam product: holes
SPAN 60 + 65 + 20[1:1:1]
total water = 650 ml
free water = 38 ml -continued incorporated = 612 ml
appearance of the foam product: smooth
SPAN 60 + 65 + 40[1:1:1]
total water = 700 ml
free water = 52 ml
incorporated = 648 ml
appearance of the foam product: smooth
SPAN 60 + 65 + 80[1:1:1]
total water = 700 ml
free water = 45 ml
incorporated = 655 ml
appearance of the foam product: small holes
SERIES B
SPAN 80 + 85[1:1]
total water = 600 ml
free water = 60 ml
incorporated = 540 ml
appearance of the foam product: smooth
SPAN 80 + 85 + 20[1:1:1]
total water = 700 ml
free water = 45 ml
incorporated = 655 ml
appearance of the foam product: smooth
SPAN 80 + 85 + 40[1:1:1]
total water = 700 ml
free water = 38 ml
incorporated = 662 ml
appearance of the foam product: smooth
SPAN 80 + 85 + 60[1:1:1]
total water = 700 ml
free water = 45 ml
incorporated = 655 ml
appearance of the foam product: smooth
SERIES C
SPAN 60
total water = 550 ml
free water = 32 ml
incorporated = 518 ml
appearance of the foam product: holes
SPAN 60 + 20[1:1]
total water = 700 ml
free water = 45 ml
incorporated = 655 ml
appearance of the foam product: smooth
SPAN 60 + 40[1:1]
total water = 700 ml
free water = 47 ml
incorporated = 653 ml
appearance of the foam product: smooth
SPAN 60 + 80[1:1]
total water = 700 ml
free water = 44 ml
incorporated = 656 ml
appearance of the foam product: smooth
SERIES D
SPAN 80
total water = 600 ml
free water = 47 ml
incorporated = 553 ml
appearance of the foam product: smooth
SPAN 80 + 20[1:1]
total water = 700 ml
free water = 48 ml
incorporated = 652 ml -continued appearance of the foam product: smooth
SPAN 80 + 40[1:1]
total water = 700 ml
free water = 39 ml
incorporated = 661 ml
appearance of the foam product: smooth
SERIES E
SPAN ® 85
no emulsion
SPAN 85 + 20[1:1]
total water = 400 ml
free water = 17 ml
incorporated water = 383 ml
appearance of the foam product: smooth
SPAN 85 + 40[1:1]
total water = 400 ml
free water = 13 ml
incorporated water = 387 ml
appearance of the foam product: smooth
SPAN 85 + 60[1:1]
total water = 500 ml
free water = 34 ml
incorporated water = 466 ml
appearance of the foam product: smooth
SERIES F
SPAN 65
no emulsion
SPAN 65 + 20[1:1]
total water = 400 ml
free water = 5 ml
incorporated water = 395 ml
appearance of the foam product: smooth
SPAN 65 + 40[1:1]
total water = 400 ml
free water = 5 ml
incorporated water = 395 ml
appearance of the foam product: smooth
SPAN 65 + 80[1:1]
total water = 500 ml
free water = 23 ml
incorporated water = 477 ml
appearance of the foam product: smooth
SPAN 65 + 85[1:1]
no emulsion
SERIES G
SPAN 20
total water = 700 ml
free water = 84 ml
incorporated water = 616 ml
appearance of the foam product: smooth
SPAN 20 + 40[1:1]
total water = 700 ml
free water = 47 ml
incorporated water = 653 ml
appearance of the foam product: smooth
SPAN 20 + 40[2:1]
total water = 760 ml
free water = 49 ml
incorporated water = 711 ml
appearance of the foam product: smooth
SPAN 20 + 40[1:2]
total water = 730 ml
free water = 42 ml
incorporated water = 688 ml
appearance of the foam product: smooth
SPAN 40
total water = 750 ml
free water = 52 ml
incorporated water = 698 ml
appearance of the foam product: smooth

I claim:

1. A process for the preparation of a porous crosslinked polymeric material comprising the steps of:
   (a) providing a water-in-oil high internal phase emulsion comprising (i) a mixture of polymerizable monomers comprising at least one vinyl monomer and from about 2 to about 50 weight percent, based on the mixture, of a difunctional unsaturated crosslinking monomer, (ii) at least 90 weight percent, based on the emulsion, of water as the internal phase (iii) from about 2 to about 40 weight percent, based on the polymerizable monomers, of a surfactant comprising (A) a sorbitan monoester having a fatty acid moiety of at least 6 carbon atoms and (B) at least one other sorbitan ester having at least one different fatty acid moiety than component (A), and (iv) an effective amount of a polymerization catalyst to cure the polymerizable monomers; and
   (b) heating the water-in-oil high internal phase emulsion under conditions effective to cure the polymerizable monomers.

2. The process of claim 1 in which component (iii)(A) is a sorbitan monoester having a fatty acid moiety within the range of 6 to 30 carbon atoms.

3. The process of claim 2 in which component (iii)(A) is a sorbitan ester having a $C_{12}$, $C_{16}$ or $C_{18}$ fatty acid group moiety and (iii)(B) comprises a sorbitan ester having at least one different fatty acid moiety of at least 6 carbon atoms.

4. The process of claim 3 in which component (iii)(A) is selected from the group consisting of sorbitan monolaurate, sorbitan monopalmitate, sorbitan monostearate and sorbitan monooleate.

5. The process of claim 4 in which component (iii)(A) is sorbitan monolaurate and component (iii)(B) is sorbitan monopalmitate.

6. The process of claim in which component (iii) further comprises (C) at least one other sorbitan ester.

7. The process of claim 1 in which component (iii)(A) is present in an amount from about 5 weight percent to about 95 weight percent, based on the surfactant.

8. The process of claim 7 in which component (iii)(A) is present in an amount from about 10 weight percent to about 90 weight percent, based on the surfactant.

9. The process of claim 1 in which the emulsion is cured until 85% of the monomers are reacted.

10. The process of claim 7 in which the emulsion is cured until 90% of the monomers are reacted.

11. The process of claim 1 in which the vinyl monomer is selected from the group consisting of monoalkenyl arenes, acrylate or methacrylate esters and mixtures thereof.

12. The process of claim 1 in which the difunctional unsaturated crosslinking monomer is selected from the group consisting of divinyl benzene, diethylene glycol dimethacrylate, 3-butylene dimethacrylate, allyl methacrylate and mixtures thereof.

13. The process of claim 1 in which the water-in-oil high internal phase emulsion comprises as the internal phase, at least about 95 weight percent, based on the emulsion, of water 14. The process of claim 1 in which the water-in-oil high internal phase emulsion further comprises an electrolyte.

15. The process of claim 1 in which the polymerization catalyst is present in an amount of about 0.005 to about 15 weight percent based on the polymerizable monomers.

16. The process of claim 15 in which the water-in-oil high internal phase emulsion is cured at a temperature within the range of about 25° C. to about 90° C.

17. The process of claim 16 in which the water-in-oil high internal phase emulsion is cured at a temperature within the range of about 30° C. to about 70° C. for at least one hour.

18. In a process for the preparation of a porous crosslinked polymeric material by polymerizing monomers in a water-in-oil high internal phase emulsion comprising i) a mixture of polymerizable monomers comprising at least one vinyl monomer and a difunctional unsaturated crosslinking monomer, ii) at least 90 weight percent, based on the emulsion, of water as the internal phase, iii) a surfactant, and iv) a polymerization catalyst, the improvement which comprises:

forming the water-in-oil high internal phase emulsion in the presence of a surfactant mixture comprising at least two sorbitan monoesters selected from the group consisting of sorbitan monolaurate, sorbitan monopalmitate, sorbitan monostearate and sorbitan monooleate.

19. The process of claim 18 in which the surfactant mixture is comprised of sorbitan monolaurate and sorbitan monopalmitate or sorbitan monolaurate and sorbitan monostearate.

20. The process of claim 19 in which the surfactant mixture is comprised of sorbitan monolaurate and sorbitan monopalmitate.

21. The process of claim 18 in which the surfactant mixture further comprises at least one other sorbitan ester.

22. The process of claim 21 in which the other sorbitan ester is a sorbitan ester having a fatty acid moiety of at least 6 carbon atoms.

23. The process of claim 22 in which the surfactant mixture is comprised of sorbitan monolaurate, sorbitan monopalmitate and sorbitan monostearate

* * * * *